United States Patent
Majumder et al.

(10) Patent No.: US 10,855,694 B2
(45) Date of Patent: Dec. 1, 2020

(54) METHODS, SYSTEMS, AND COMPUTER READABLE MEDIA FOR MONITORING ENCRYPTED PACKET FLOWS WITHIN A VIRTUAL NETWORK ENVIRONMENT

(71) Applicant: Keysight Technologies Singapore (Sales) Pte. Ltd, Singapore (SG)

(72) Inventors: Anirban Majumder, San Ramon, CA (US); Marcel Felix Desdier, Pleasanton, CA (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 84 days.

(21) Appl. No.: 15/608,369

(22) Filed: May 30, 2017

(65) Prior Publication Data
US 2018/0351970 A1    Dec. 6, 2018

(51) Int. Cl.
*H04L 29/06*    (2006.01)

(52) U.S. Cl.
CPC ...... *H04L 63/1408* (2013.01); *H04L 63/0227* (2013.01); *H04L 63/0281* (2013.01); *H04L 63/0428* (2013.01); *H04L 63/061* (2013.01); *H04L 63/0853* (2013.01); *H04L 63/166* (2013.01)

(58) Field of Classification Search
CPC ............ H04L 63/1408; H04L 63/0853; H04L 63/166; H04L 63/0281; H04L 63/061
See application file for complete search history.

(56) References Cited

U.S. PATENT DOCUMENTS

| 5,557,678 A | * | 9/1996 | Ganesan | ............... H04L 9/0822 |
| | | | | 380/239 |
| 6,330,671 B1 | * | 12/2001 | Aziz | ..................... H04L 9/0822 |
| | | | | 380/277 |
| 6,480,488 B1 | | 11/2002 | Huang | |
| 6,684,331 B1 | * | 1/2004 | Srivastava | ............ H04L 9/0836 |
| | | | | 713/163 |

(Continued)

OTHER PUBLICATIONS

Commonly-assigned, co-pending U.S. Appl. No. 16/103,598 for "Methods, Systems, and Computer Readable Media For Implementing Bandwidth Limitations on Specific Application Traffic at a Proxy Element," (Unpublished, filed Aug. 14, 2018).

(Continued)

*Primary Examiner* — David Garcia Cervetti

(57) ABSTRACT

Methods, systems, and computer readable media for packet monitoring in a virtual environment are disclosed. According to one method executed at a virtual tap element residing in between a first virtual machine and a second virtual machine in a virtual network environment, the method includes obtaining cryptographic key information from either the first virtual machine or the second virtual machine and detecting an encrypted packet flow being communicated in the virtual network environment between the first virtual machine and the second virtual machine via the virtual tap element. The method further includes decrypting the encrypted packet flow using the cryptographic key information, generating a decrypted packet flow set comprising at least a portion of the decrypted packet flow, and sending the decrypted packet flow set to a packet analyzer.

20 Claims, 4 Drawing Sheets

(56) References Cited

U.S. PATENT DOCUMENTS

| | | | |
|---|---|---|---|
| 7,340,744 B2 | 3/2008 | Chandwadkar et al. | |
| 7,363,353 B2* | 4/2008 | Ganesan | H04L 29/06 370/235 |
| 7,373,412 B2 | 5/2008 | Colas et al. | |
| 7,421,506 B2 | 9/2008 | Ni et al. | |
| 7,562,213 B1 | 7/2009 | Timms | |
| 7,634,650 B1* | 12/2009 | Shah | H04L 67/1097 713/150 |
| 7,778,194 B1* | 8/2010 | Yung | H04L 47/10 370/252 |
| 7,971,240 B2* | 6/2011 | Guo | H04L 9/0844 726/10 |
| 8,270,942 B2 | 9/2012 | Zabawskyj et al. | |
| 8,457,126 B2 | 6/2013 | Breslin et al. | |
| 8,514,756 B1 | 8/2013 | Ramachandra et al. | |
| 8,566,247 B1* | 10/2013 | Nagel | H04L 63/061 705/59 |
| 8,595,835 B2* | 11/2013 | Kolton | H04L 63/0428 726/23 |
| 8,601,152 B1* | 12/2013 | Chou | H04L 63/1416 709/236 |
| 8,654,974 B2* | 2/2014 | Anderson | H04L 9/0872 380/255 |
| 8,788,805 B2* | 7/2014 | Herne | H04L 63/062 713/153 |
| 8,881,282 B1* | 11/2014 | Aziz | G06F 21/00 726/24 |
| 8,929,356 B2 | 1/2015 | Pandey et al. | |
| 8,938,611 B1* | 1/2015 | Zhu | G06F 21/575 713/153 |
| 8,953,439 B1* | 2/2015 | Lin | G06F 11/1438 370/219 |
| 9,065,642 B2* | 6/2015 | Zaverucha | H04L 9/3263 |
| 9,298,560 B2 | 3/2016 | Janakiraman et al. | |
| 9,380,002 B2 | 6/2016 | Johansson et al. | |
| 9,407,643 B1* | 8/2016 | Bavington | H04L 63/1408 |
| 9,565,202 B1* | 2/2017 | Kindlund | G06F 21/567 |
| 9,673,984 B2* | 6/2017 | Jiang | H04L 9/0825 |
| 9,680,869 B2* | 6/2017 | Buruganahalli | H04L 63/0281 |
| 9,800,560 B1 | 10/2017 | Guo et al. | |
| 9,807,121 B1* | 10/2017 | Levy | H04L 63/062 |
| 9,882,929 B1* | 1/2018 | Ettema | G06F 9/45533 |
| 9,893,883 B1* | 2/2018 | Chaubey | H04L 63/061 |
| 9,906,401 B1* | 2/2018 | Rao | H04L 47/24 |
| 10,063,591 B1* | 8/2018 | Jiang | H04L 63/0464 |
| 10,079,810 B1* | 9/2018 | Moore | H04L 63/065 |
| 10,291,651 B1* | 5/2019 | Chaubey | H04L 63/20 |
| 10,326,741 B2* | 6/2019 | Rothstein | H04L 63/061 |
| 10,404,597 B2 | 9/2019 | Bakshi | |
| 10,482,239 B1* | 11/2019 | Liu | H04L 63/0263 |
| 10,516,532 B2* | 12/2019 | Taub | H04L 63/0442 |
| 2002/0116485 A1* | 8/2002 | Black | H04L 63/083 709/223 |
| 2003/0004688 A1* | 1/2003 | Gupta | H04L 63/1416 702/188 |
| 2004/0083362 A1* | 4/2004 | Park | H04L 63/0457 713/162 |
| 2004/0168050 A1* | 8/2004 | Desrochers | H04M 7/006 713/153 |
| 2005/0050362 A1* | 3/2005 | Peles | H04L 63/02 726/4 |
| 2005/0111437 A1 | 5/2005 | Maturi | |
| 2005/0160269 A1* | 7/2005 | Akimoto | H04L 63/0435 713/171 |
| 2006/0085862 A1* | 4/2006 | Witt | H04N 21/6125 726/26 |
| 2006/0259579 A1* | 11/2006 | Beverly | H04L 63/08 709/217 |
| 2007/0022284 A1* | 1/2007 | Vishwanathan | H04L 12/66 713/153 |
| 2007/0033408 A1* | 2/2007 | Morten | H04L 63/1408 713/176 |
| 2007/0078929 A1* | 4/2007 | Beverly | H04L 12/66 709/204 |
| 2007/0169190 A1* | 7/2007 | Kolton | G06F 21/552 726/22 |
| 2008/0005782 A1* | 1/2008 | Aziz | H04L 63/1425 726/3 |
| 2008/0031141 A1 | 2/2008 | Lean et al. | |
| 2008/0320297 A1* | 12/2008 | Sabo | H04L 9/0825 713/152 |
| 2009/0150521 A1* | 6/2009 | Tripathi | H04L 12/4641 709/220 |
| 2009/0150527 A1* | 6/2009 | Tripathi | H04L 45/586 709/221 |
| 2009/0150883 A1* | 6/2009 | Tripathi | G06F 9/45558 718/1 |
| 2009/0220080 A1* | 9/2009 | Herne | H04L 63/0428 380/255 |
| 2009/0222567 A1* | 9/2009 | Tripathi | H04L 29/08846 709/230 |
| 2009/0254990 A1* | 10/2009 | McGee | H04L 63/0227 726/22 |
| 2010/0250769 A1 | 9/2010 | Barreto et al. | |
| 2011/0231659 A1* | 9/2011 | Sinha | H04L 63/06 713/168 |
| 2011/0286461 A1 | 11/2011 | Ichino et al. | |
| 2011/0289311 A1* | 11/2011 | Roy-Chowdhury | H04B 7/18593 713/151 |
| 2012/0082073 A1 | 4/2012 | Andreasen et al. | |
| 2012/0137289 A1* | 5/2012 | Nolterieke | G06F 9/45558 718/1 |
| 2012/0210318 A1* | 8/2012 | Sanghvi | H04L 49/70 718/1 |
| 2012/0236823 A1 | 9/2012 | Kompella et al. | |
| 2012/0304244 A1* | 11/2012 | Xie | G06F 21/53 726/1 |
| 2013/0054761 A1 | 2/2013 | Kempf et al. | |
| 2013/0239119 A1 | 9/2013 | Garg et al. | |
| 2013/0265883 A1 | 10/2013 | Henry et al. | |
| 2013/0272136 A1 | 10/2013 | Ali et al. | |
| 2014/0082348 A1* | 3/2014 | Chandrasekaran | H04W 12/02 713/150 |
| 2014/0115702 A1* | 4/2014 | Li | H04L 9/3273 726/23 |
| 2014/0189093 A1* | 7/2014 | du Toit | H04L 63/0823 709/224 |
| 2014/0226820 A1* | 8/2014 | Chopra | H04L 63/162 380/277 |
| 2014/0351573 A1* | 11/2014 | Martini | H04L 63/0254 713/153 |
| 2015/0039889 A1* | 2/2015 | Andoni | H04L 9/0825 713/170 |
| 2015/0052345 A1* | 2/2015 | Martini | H04L 63/20 713/150 |
| 2015/0113264 A1* | 4/2015 | Wang | H04L 63/02 713/151 |
| 2015/0172219 A1 | 6/2015 | Johansson et al. | |
| 2015/0281954 A1* | 10/2015 | Warren | G06F 21/74 713/171 |
| 2015/0288679 A1* | 10/2015 | Ben-Nun | H04L 67/141 726/10 |
| 2015/0295780 A1* | 10/2015 | Hsiao | H04L 43/022 715/736 |
| 2015/0341212 A1* | 11/2015 | Hsiao | G06F 3/0482 715/735 |
| 2016/0080502 A1* | 3/2016 | Yadav | H04L 47/22 709/227 |
| 2016/0105469 A1* | 4/2016 | Galloway | H04L 63/1441 709/231 |
| 2016/0119374 A1* | 4/2016 | Williams | H04L 63/166 713/175 |
| 2016/0127517 A1* | 5/2016 | Shcherbakov | H04L 67/10 709/217 |
| 2016/0142440 A1* | 5/2016 | Qian | H04L 63/1408 713/151 |
| 2016/0277321 A1 | 9/2016 | Johansson et al. | |

(56) References Cited

U.S. PATENT DOCUMENTS

| | | | |
|---|---|---|---|
| 2016/0294784 A1* | 10/2016 | Hopkins | H04L 51/12 |
| 2016/0373185 A1* | 12/2016 | Wentzloff | H04W 52/0229 |
| 2017/0048328 A1 | 2/2017 | Korotaev et al. | |
| 2017/0070531 A1* | 3/2017 | Huston, III | H04L 63/1416 |
| 2017/0237719 A1* | 8/2017 | Schwartz | G06F 21/602 |
| | | | 713/153 |
| 2017/0364794 A1* | 12/2017 | Mahkonen | H04L 43/10 |
| 2018/0006923 A1* | 1/2018 | Gao | H04L 43/062 |
| 2018/0097787 A1* | 4/2018 | Murthy | H04L 63/0236 |
| 2018/0097788 A1* | 4/2018 | Murthy, Sr. | H04L 63/102 |
| 2018/0097840 A1* | 4/2018 | Murthy | H04L 63/02 |
| 2018/0124025 A1* | 5/2018 | Lam | H04L 63/1425 |
| 2018/0176036 A1* | 6/2018 | Butcher | H04L 69/22 |
| 2018/0176192 A1* | 6/2018 | Davis | H04L 63/166 |
| 2018/0198838 A1 | 7/2018 | Murgia et al. | |
| 2018/0234322 A1* | 8/2018 | Cohn | H04L 41/12 |
| 2018/0278419 A1* | 9/2018 | Higgins | H04L 9/0841 |
| 2018/0331912 A1* | 11/2018 | Edmison | H04L 43/028 |
| 2018/0367422 A1* | 12/2018 | Raney | H04L 43/12 |
| 2019/0068564 A1 | 2/2019 | Putatunda et al. | |
| 2019/0166049 A1 | 5/2019 | Bakshi | |
| 2019/0303385 A1* | 10/2019 | Ching | H04L 41/22 |
| 2020/0053064 A1 | 2/2020 | Oprisan et al. | |
| 2020/0067700 A1 | 2/2020 | Bergeron | |
| 2020/0076773 A1* | 3/2020 | Monat | H04L 63/0428 |

OTHER PUBLICATIONS

"Inspection of SSL Traffic Overview," Juniper Networks, pp. 1-4 (Jan. 19, 2011).
Commonly-assigned, co-pending U.S. Appl. No. 16/113,360 for "Monitoring Encrypted Network Traffic Flows in a Virtual Environment Using Dynamic Session Key Acquisition Techniques," (Unpublished, filed Aug. 27, 2018).
Schulist et al., "Linux Socket Filtering aka Berkeley Packet Filter (BPF)," Wayback Machine, https://www.kernel.org/doc/Documentation/networking/filter.txt, pp. 1-25 (Jun. 8, 2018).
Commonly-assigned, co-pending U.S. Appl. No. 15/980,699 for "Methods, Systems, and Computer Readable Media for Monitoring Encrypted Network Traffic Flows" (Unpublished, filed May 15, 2018).
Starovoitov, "[PATCH net-next 6/6] samples: bpf: large eBPF program in C," lkml.org, https://lkml.org/lkml/2014/11/27/10, pp. 1-5 (Nov. 26, 2014).
Andreyev, "Introducing data center fabric, the next-generation Facebook data center network," Data Center Engineering, Networking & Traffic, Production Engineering, https://code.fb.com/production-engineering/introducing-data-center-fabric-the-next-generation-facebook-data-center-network/, pp. 1-10 (Nov. 14, 2014).
Corbet, "Extending extended BPF," LWN.net, https://lwn.net/Articles/603983/, pp. 1-4 (Jul. 2014).
Corbet, "BPF: the universal in-kernel virtual machine," LWN.net, https://lwn.net/Articles/599755/, pp. 1-3 (May 2014).
Git, "Linux Kernel Source Tree," https://git.kernel.org/pub/scm/linux/kernel/git/torvalds/linux.git/tree/samples/bpf/sockex2_kern.c, pp. 1-4 (2018).
Nubeva, "Nubeva TLS Decrypt: Out-of-Band Decryped Visibility for the Cloud" www.nubeva.com/decryption, pp. 1-8 (Sep. 2019).
Nubeva, "What is the Symmetric Key Intercep Architecture?" https://www.nubeva.com/blog/what-is-symmetric-key-intercept-architecture, pp. 1-4 (Aug. 8, 2019).
Notice of Allowance and Fee(s) Due for U.S. Appl. No. 15/826,787 (dated Apr. 25, 2019).
Non-Final Office Action for U.S. Appl. No. 15/826,787 (dated Jan. 3, 2019).
Solution Brief, "Smart Packet Brokering for Mobile Network Operators," Brocade, pp. 1 (Jul. 19, 2017).
Vavilapalli et al., Cord Design Notes, "Cord Monitoring Service," pp. 1-14 (Mar. 14, 2016).
ACG Research, "Business Case for Brocade Network Analytics for Mobile Network Operators," pp. 1-11 (2015).
Ixia Anue GTP Session Controller, Take Control of GTP Monitoring to Improve Customer QoE and Maximize Network ROI, Solution Brief, Document No. 915-6606-01 Rev. A, pp. 1-2 (Sep. 2013).
Ixia Network Visibility Solutions, Anue GTP Session Controller 7433, Product Specifications, Document No. 915-6504-01 Rev. B, pp. 1-3 (May 2013).
Commonly-assigned, co-pending U.S. Appl. No. 16/781,542 for "Methods, Systems, and Computer Readable Media for Processing Network Flow Metadata at a Network Packet Broker," (Unpublished, filed Feb. 4, 2020).
Non-Final Office Action for U.S. Appl. No. 15/980,699 (dated Dec. 9, 2019).
Non-Final Office Action for U.S. Appl. No. 16/113,360 (dated May 19, 2020).
Non-Final Office Action for U.S. Appl. No. 16/103,598 (dated May 11, 2020).
Final Office Action for U.S. Appl. No. 15/980,699 (dated Apr. 20, 2020).
Paul, Santanu, "Network Visibility Component with Netflow Jumbo Frame Support," The IP.com Journal, pp. 1-8 (Aug. 2019).
Paul, Santanu, "Methods and Systems for Session-Aware Collection of Netflow Statistics," The IP.com Journal, pp. 1-5 (Jul. 2019).
Pandey, Shardendu; Johansson, Stefan Jan, "Network Packet Broker with Flow Segmentation Capability," The IP.com Journal, pp. 1-6 (Jul. 2019).
Paul, Santanu, "Network Packet Broker with Flow Segmentation Capability," The IP.com Journal, pp. 1-6 (Aug. 2019).
Paul, Santanu, "Custom Key Performance Indicator (KPI) Network Visibility System," The IP.com Journal, pp. 1-4 (Jul. 2019).
Paul, Santanu, "Self-Healing Network Visibility System," The IP.com Journal, pp. 1-5 (Jun. 2019).
Paul, Santanu, "Network Visibility System with Integrated Netflow Over Syslog Reporting Capability" IP.com Journal, pp. 1-7 (Jan. 28, 2019).
Evans, David, "Network Packet Broker with Dynamic Filter Rules," The IP.com Journal, pp. 1-8 (Jun. 2018).
Advisory Action and AFCP 2.0 Decision for U.S. Appl. No. 15/980,699 (dated Jun. 30, 2020).

* cited by examiner

METHODS, SYSTEMS, AND COMPUTER READABLE MEDIA FOR MONITORING ENCRYPTED PACKET FLOWS WITHIN A VIRTUAL NETWORK ENVIRONMENT

TECHNICAL FIELD

The subject matter described herein relates to monitoring of encrypted packets. More specifically, the subject matter relates to methods, systems, and computer readable media for monitoring encrypted packet flows within a virtual network environment.

BACKGROUND

A virtual network environment typically involves one or more computing platforms and/or hardware executing virtualization software for implementing virtual entitles, such as virtual machines (VMs), virtual workloads, and the like. The virtual entities (e.g., VMs) may be deployed for a variety of purposes, such as functioning as web servers or multimedia servers. While physical network taps (e.g., external monitoring devices that monitor packet traffic between two physical network nodes) can be used to monitor communications in traditional networks, inherent aspects of a virtual network environment make the utilization of physical network taps impracticable and less desirable. Since packet traffic in a virtual environment may be communicated between virtual workloads supported by virtual machines that exist solely within a single device or computing platform, a physical network tap residing in a traditional hardware based network infrastructure is largely unable to monitor the virtual packet flows (i.e., "east-west" traffic) communicated between the virtual entities.

Accordingly, a need exists for methods, systems, and computer readable media for monitoring encrypted packet flows within a virtual environment.

SUMMARY

Methods, systems, and computer readable media monitoring encrypted packet flows within a virtual network environment are disclosed. According to one method executed at a virtual tap element residing in between a first virtual machine and a second virtual machine in a virtual network environment, the method includes obtaining cryptographic key information from either the first virtual machine or the second virtual machine and detecting an encrypted packet flow being communicated in the virtual network environment between the first virtual machine and the second virtual machine via the virtual tap element. The method further includes decrypting the encrypted packet flow using the cryptographic key information, generating a decrypted packet flow set comprising at least a portion of the decrypted packet flow, and sending the decrypted packet flow set to a packet analyzer.

According to one system, the system includes a virtual tap element implemented using at least one processor and memory. The virtual tap device is configured to obtain cryptographic key information from either the first virtual machine or the second virtual machine, to detect an encrypted packet flow being communicated in the virtual network environment between the first virtual machine and the second virtual machine via the virtual tap element, to decrypt the encrypted packet flow using the cryptographic key information, to generate a decrypted packet flow set comprising at least a portion of the decrypted packet flow, and to send the decrypted packet flow set to a packet analyzer.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary non-transitory computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term 'node' refers to a physical computing platform including one or more processors, network interfaces, and memory.

As used herein, each of the terms 'function', 'engine', and 'module' refers to hardware, which may also include software and/or firmware, for implementing the feature(s) being described.

As used herein, the term "packet" refers to a network packet or any formatted unit of data capable of being transmitted in a computer network, such as protocol data unit, a frame, a datagram, a user datagram protocol packet, a transport control protocol packet, etc.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for monitoring encrypted packet flows within a virtual network environment. Packet monitoring in a virtual network environment can be difficult since some virtual entities (e.g., virtual machines (VMs), virtual workloads, virtual containers, etc.) may execute at or within a common computing platform and, therefore, physical network taps or other stand-alone devices may be unable to monitor packet traffic (e.g., "east-west" packet traffic) communicated between the virtual entities. This situation is even more problematic when the east-west packet traffic is encrypted. The disclosed subject matter addresses this matter by implementing virtual taps within the virtual network environment to capture the encrypted east-west packet traffic. After successfully capturing the encrypted packet flows, a virtual tap may then be configured to function as a proxy (e.g., an SSL proxy) and decrypt the encrypted packets flows, which are subsequently forwarded to a packet analysis tool. The virtual tap may be further configured to send all of the decrypted packets of the decrypted packet flow(s) to the network packet analyzer (e.g., a packet analysis tool) or, alternatively, conduct a filtering process on the decrypted packets in an attempt to reduce the processing of the packet analyzer. Reference will now be made in detail to various embodiments of the subject matter described herein, examples of which are illustrated in the accompanying drawings. Wherever possible, the same reference numbers will be used throughout the drawings to refer to the same or like parts.

Figure 1:
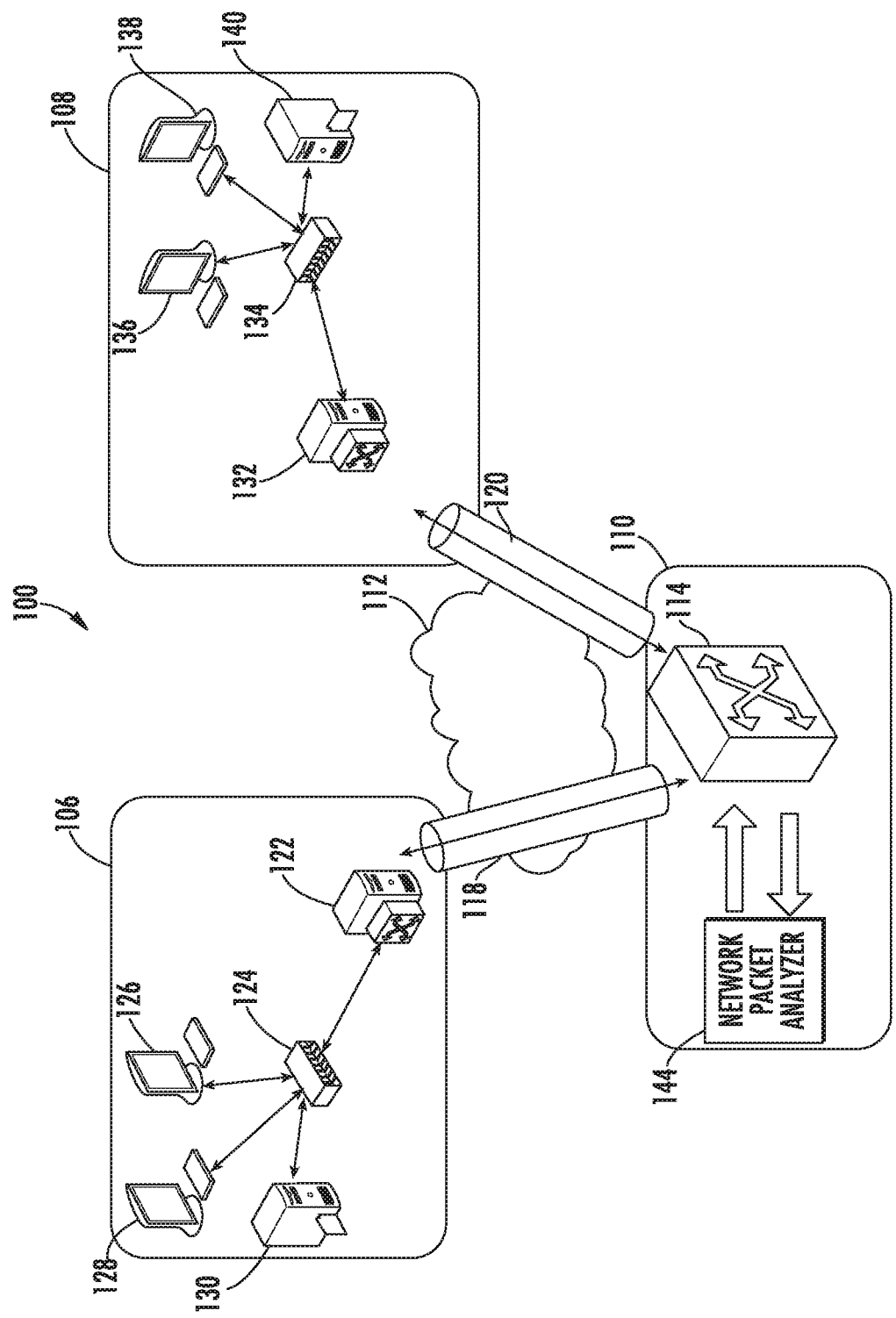
FIG. 1 is a block diagram illustrating a virtual network environment that utilizes a virtual tap element to monitor encrypted packet flows according to an embodiment of the subject matter described herein.

FIG. 1 is a diagram illustrating a virtual network environment 100 for monitoring encrypted packet flows according to an embodiment of the subject matter described herein. Virtual network environment 100 may include one or more virtual networks, virtual computing platforms, virtual nodes, virtual machines, virtual workloads, or the like. Referring to FIG. 1, virtual network environment 100 may include virtual networks 106, 108, and 110. Virtual network 106 includes a number of virtual entities, such as virtual machines 126-130, a virtual switch 124, and a virtual gateway 122. Similarly, virtual network 108 includes virtual entities, such as virtual machines 136-140, a virtual switch 134, and a virtual gateway 132. Virtual network environment 100 may also include a virtual network 110 that comprises a virtual tap element 114 and a network packet analyzer 144. Network packet analyzer 144 may comprise any hardware-based or virtual analytics tool configured to analyze provided packet flows. Virtual network 106, virtual network 108, virtual network 110 may be communicatively connected over a packet network (e.g., including, but not limited to, the Internet or a private network associated with a cloud service provider). For the purposes of this subject matter, it is understood that network 112 is an untrusted packet-based network.

Notably, the virtual entities of virtual network environment 100 may be supported by underlying physical hardware devices (e.g., physical processors, physical communications interfaces, switches, storage devices, etc.) that execute virtualization software for implementing the virtual entities (e.g., virtual machines (VMs), virtualization containers, virtual workloads, etc.). For example, each of virtual networks and/or virtual machines may be supported or hosted by a respective server blade or network card that is inserted into a computer platform chassis and communicate via a backplane bus of the computer platform.

Each of virtual switches 124 and 134 may represent any suitable entity (e.g., software stored in a memory and/or executing using at least one processor) for performing one or more packet switching functions in a virtual network environment. For example, virtual switch 124 may be a logical construct implemented using hardware or physical resources from one or more locations, devices, and/or platforms. For example, virtual switch 124 may be implementing using the same computing platform as virtual machines 126-128. In some embodiments, virtual switch 124 may be communicatively coupled with or implemented using a hypervisor. For example, a hypervisor may include computer software, firmware or hardware that creates and executes virtual machines 126-128. In this example, the hypervisor may emulate various physical components for virtual machines 126-128 and may facilitate communications (e.g., VM commands, data packets, etc.) in virtual network environment 100.

In some embodiments, virtual switch 124 may facilitate communications between various virtual entities, such as virtual machine 102 and virtual gateway 122, in virtual network 102. For example, packets from virtual machine 126 may be sent to virtual machine 128 or virtual gateway 122 via virtual switch 124. In some embodiments, virtual gateway 122 may also facilitate communications between virtual entities and external entities, e.g., nodes in other virtual networks (e.g., virtual network 108). For example, virtual gateway 122 may send traffic from virtual machine 128 to virtual network 108.

As discussed below in greater detail, virtual tap element 114 may be configured to monitor encrypted packet flows communicated between virtual machines in virtual networks 106 and 108. For example, if a virtual machine 130 in virtual network 106 sends one or more packets attempting to establish an encrypted packet flow to a destination virtual machine 140 (e.g., packets traverse via virtual switch 124, virtual gateway 122, virtual tap element 114, virtual gateway 132, and virtual switch 134), virtual tap element 114 may be configured to monitor for encrypted packets by inspecting the packet header or payload of each packet in a communicated packet flow in order to detect an SSL handshake message, TLS handshake message, or some other request message to establish a secure session generated by virtual machine 130.

After detecting a packet associated with an SSL handshake, virtual tap element 114 may establish an encrypted secure channel with each of virtual gateway 122 and virtual gateway 132 to facilitate a secure connection between virtual gateways 122 and 132 that can be monitored by virtual tap element 114. For example, virtual tap element 114 may establish a separate secure socket layer (SSL) and/or transport layer security (TLS) session with each of virtual gateways 122 and 132. By establishing the SSL or TLS connections (e.g., secure connections 118 and 120), virtual tap element 114 may serve as a proxy element for virtual gateways 122 and 132 in the virtual network environment and functions in a transparent manner such that virtual gateways 122 and 132 are unaware of the presence of virtual tap element 114. For example, although two separate SSL sessions (e.g., via secure connections 118 and 120) are established with each of virtual gateways 122 and 132, virtual tap element 114 may utilize the same secure session key for both sessions at the same time (e.g., similar to virtual gateway 122 and virtual gateway 132 using the same session key without an intermediary network element). In some embodiments, virtual tap element 114 may receive the session key or a private decryption key from one of the communicating virtual machines (that recognizes virtual tap element 114 as a trusted entity). If provided with the session key, virtual tap element 114 is able to decrypt any encrypted packet flow that is communicated between the two virtual machines (and that traverses via the virtual tap element 114) in the virtual network environment. Once virtual tap element 114 has determined the session key as described above, virtual tap element 114 stores the session in a key store database (e.g., key store 220).

In an alternate embodiment, in response to detecting a packet belonging to a communicated packet flow attempting to establish a secure session (e.g., directed to a destination virtual machine 140), virtual tap element 114 may generate and send its own SSL handshake message to destination virtual machine 140 and receives a trust certificate and/or public encryption key in a response message from destination virtual machine 140. At this stage, virtual tap element 114 may access a stored session key previously provided by a virtual machine 202 and to provide the session key (obtained from virtual machine 130) as its own to virtual machine 140. In particular, virtual tap element 114 uses a public key received from virtual machine 140 to encrypt the session key and provide the session key to virtual machine 140. Notably, virtual tap element 114 has established a separate secure session (e.g., two separate SSL sessions) with each of virtual machine 130 and virtual machine 140 that uses the single session key (e.g., two separate SSL sessions that both use the same session key). By establishing two separate secure sessions in this manner, virtual tap element 114 is able to decrypt encrypted packets belonging to an encrypted packet flow being communicated between virtual machine 130 and virtual machine 140.

After virtual tap element 114 decrypts the encrypted packets of the encrypted packet flow (or copy thereof), virtual tap element 114 may subsequently provide all of the decrypted packets (or a decrypted packet flow subset that has been filtered) to a packet analyzer 144. Notably, packet analyzer 144 is able to perform its configured analytics on the decrypted packets (e.g., clear text) provided by virtual tap element 114 without ever having the need to know, or be provided with, a session key from any virtual network entity.

It will be appreciated that FIG. 1 is for illustrative purposes and that various depicted entities, their locations, and/or their functions described above in relation to FIG. 1 may be changed, altered, added, or removed. For example, a device (e.g., a computer including at least one processor coupled to a memory) may include functionality of virtual tap controller and be separate from one or more computing platforms implementing virtual network environment 100.

Figure 2:
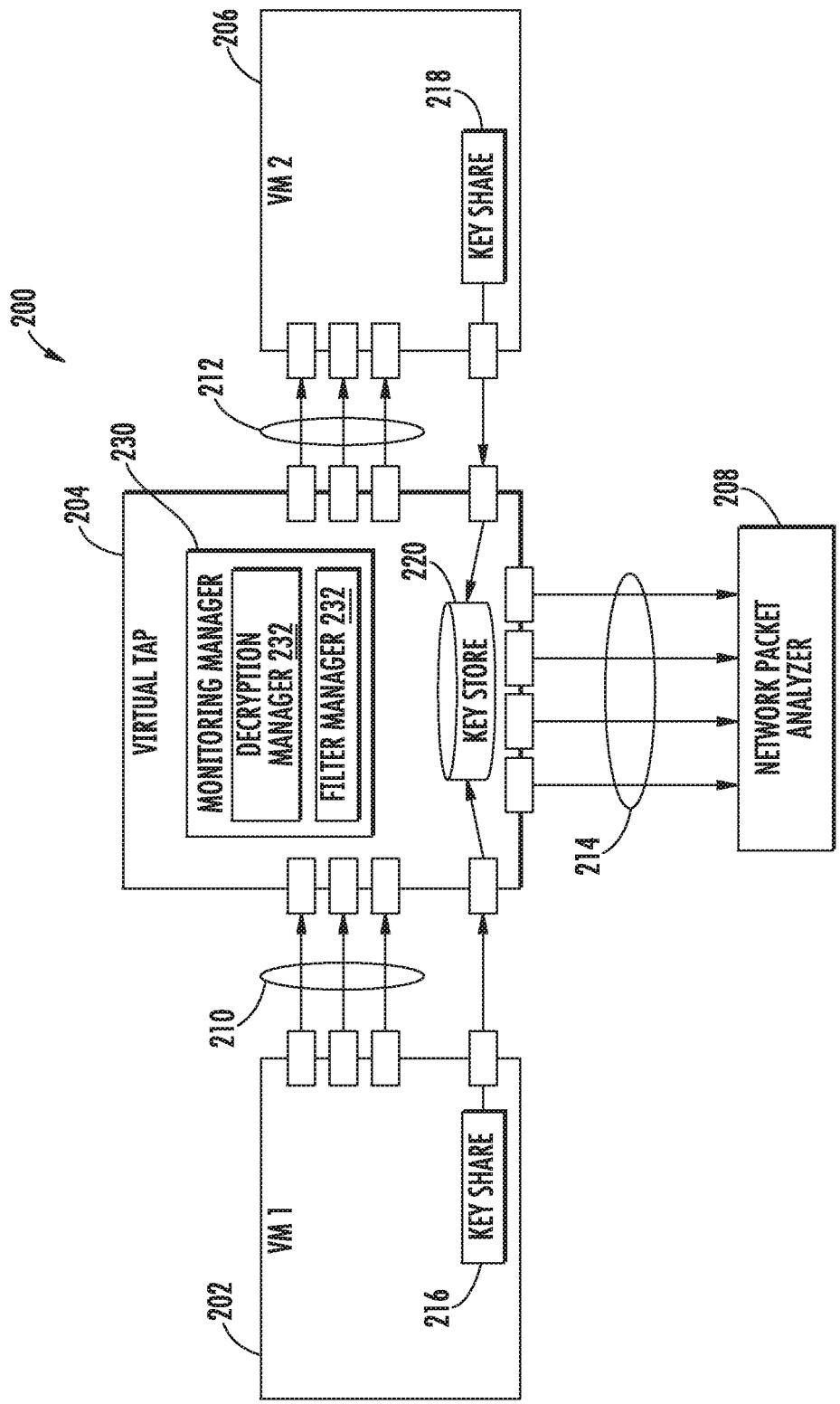
FIG. 2 is a block diagram illustrating a virtual tap element configured to monitor encrypted packet traffic that is communicated between two virtual machines in a virtual network environment according to an embodiment of the subject matter described herein.

FIG. 2 is a block diagram illustrating a virtual tap element configured to monitor encrypted packet traffic that is communicated between two virtual machines in a virtual network environment according to an embodiment of the subject matter described herein. In particular, FIG. 2 depicts a logical block diagram of a virtual tap element 204 (not unlike virtual tap element 114 in FIG. 1) that is configured to receive east-west packet flows communicated between virtual machine 202 and virtual machine 206 in virtual network environment 200. Each of virtual machine 202 and virtual machine 206 may represent any suitable entity (e.g., software stored in a memory and/or executing using at least one processor) for performing one or more computer functions, such as web services, telephony services, multimedia services, and/or other function or services. Each of virtual machine 202 and virtual machine 206 may be a logical construct implemented using hardware or physical resources from one or more locations, devices, and/or platforms. For example, virtual machine 202 may be implemented by using at least one processor from a first computing platform or server rack and memory from a second computing platform or server rack. In another example, virtual machine 202 may be implemented using processors and memory from a same computing platform or server rack. Regardless of the manner in which a virtual machine is implemented, the virtual machine may be configured to perform any number of network functions or workloads, such as SIP related or telephony functions, receiving hypertext transfer protocol (HTTP) requests and providing HTTP responses, and the like.

Virtual tap element 204 is configured for monitoring packets that traverse virtual network environment 200. Virtual tap element 204 may represent any suitable entity (e.g., software stored in a memory and/or executing using at least one processor) for performing one or more virtual network tap related functions, such as packet monitoring, packet screening, packet filtering, packet copying, and/or packet forwarding. Virtual tap element 204 may be a logical construct implemented using hardware or physical resources from one or more locations, devices, and/or platforms. For example, virtual tap element 204 may be implemented using the same computing platform as virtual machine 202 or virtual machine 206.

In some instances, virtual tap element 204 may function as a proxy element by creating two separate secure sessions (e.g., SSL sessions or TLS sessions) with the two virtual machines. In some embodiments, virtual machine 202 and virtual machine 206 may represent virtual workloads, virtual functions, or virtual containers executed inside a single hardware based host device or computing platform. For example, each of virtual tap element 114 and the communicating virtual machines 202 and 206 may be server blades or cards that are inserted into a computer platform chassis and communicate via a backplane bus.

In some embodiments, virtual tap element 204 may establish an encrypted secure channel (e.g., an encrypted SSL connection) with each of virtual machine 202 and virtual machine 206 to facilitate a secure connection between virtual machines 202 and 206. For example, virtual tap element 204 may establish separate SSL sessions with each of virtual gateways 122 and 132. By establishing the SSL connections, virtual tap element 204 may serve as a proxy element for virtual machines 202 and 206 and functions in a transparent manner such that virtual machines 202 and 206 are unaware of the presence of virtual tap element 204. For example, although a separate SSL session is established with each of virtual machines 202 and 206, virtual tap element 204 utilizes the same secure session key for both sessions at the same time (e.g., similar to where virtual machine 202 and virtual machine 206 would use the same session key without an intermediary network element). In some embodiments, virtual tap element 204 may receive the session key or a private decryption key directly from one of the communicating virtual machines (that recognizes virtual tap element 204 as a trusted entity). If provided with the session key, virtual tap element 204 is able to decrypt any packet belonging to an encrypted packet flow that is communicated between two virtual machines via the virtual tap element 204.

Virtual tap element 204 may also include a key store 220, which may be any suitable virtual entity (e.g., a non-transitory computer readable medium, embedded memory, or a memory device) for storing cryptographic key information (e.g., private decryption keys, session keys, etc.) associated with packet monitoring and/or virtual tap related functions. For example, key store 220 may store various cryptographic key information (e.g., private decryption keys, session keys, etc.) that are mapped and correspond to a plurality of encrypted packets flows communicated between virtual machines 202 and 206. In some embodiments, key store 220 may be accessible by monitoring manager 230 and/or decryption manager 232. In some embodiments, key store 220 may be located on a single device or computing platform or may be distributed across multiple devices or computing platforms.

In some embodiments, virtual tap element 204 may be configured by a virtual tap controller (not shown) (e.g., a testing platform, a test tool, a device, a node, and/or software in a virtual machine executing on one or more computing platforms) to perform any number of aspects associated with packet monitoring. For example, the virtual tap controller may configure virtual tap element 204 to perform various packet monitoring related activities, such as packet filtering, packet screening, packet copying, and/or packet forwarding. In this example, virtual tap element 204 may monitor packets communicated in virtual network environment 200 in accordance with the rules and policies received from a virtual tap element controller.

As shown in FIG. 2, virtual machine 202 includes key share manager 216. Similarly, virtual machine 206 includes key share manager 218. In some examples, each of key share manager 216 and 218 is responsible for determining whether virtual tap element 204 is a trusted entity. For example, a key share manager may obtain and/or store trust certificates for virtual tap elements, such as virtual tap element 204. A key share manager may also provide cryptographic key information (e.g., a session key, a private decryption key, a public encryption key, and/or the like) to virtual tap element 204. More specifically, key share manager 216 may provide a session key to virtual tap element 204 in the event virtual machine 202 and/or key share manager 216 determines or recognizes virtual tap element 204 as a trusted entity.

In some examples, virtual tap element 204 includes a key store 220 and a monitoring manager 230, which in turn comprises a decryption manager 232 and a filter manager 234. Monitoring manager 230 may be provisioned (e.g., by a virtual tap controller) with policies and rules that permit virtual tap element 204 to detect any packet flow that is received or intercepted by virtual tap element 204. In some embodiments, monitoring manager 230 may be configured with monitoring policies or rules that enable virtual tap element 204 to monitor for specific packet flow parameters. The packet flow parameters may be data that can be used to identify or categorize packets traversing virtual tap element 204 that are correlated by a unique source IP address, timestamp, packet type (e.g., SSL handshake). The monitoring policies/rules may also direct virtual tap element 204 to provide a decrypted packet traffic set to a network packet analyzer 208 for packet processing and analysis.

FIG. 2 further depicts virtual machine 202 communicating encrypted packet flow(s) 210 (e.g., SSL encrypted inter-VM packet flows) to virtual tap element 204 via a plurality of virtual ports. Notably, encrypted packet flow 210 is east-west packet traffic that is communicated completely within a host or computing platform and does not traverse traditional network hardware infrastructure. FIG. 2 further depicts virtual tap element 204 communicating encrypted packet flow(s) 212 to virtual machine 206 via a plurality of virtual ports. In some examples, encrypted packet flow 212 represents the original encrypted packet flow 210 that is received and forwarded by virtual tap element 204 in a transparent manner.

Decryption manager 232 is responsible for accessing key store 220 to obtain cryptographic key information (e.g., session key or private decryption key) to decrypt any packets associated with a detected encrypted packet flow. For example, after monitoring manager 230 identifies an encrypted packet flow, decryption manager 232 creates a copy of the encrypted packet flow, decrypts the packets of the copy of the encrypted packet flow to generate a decrypted packet flow set. In some embodiments, monitoring manager 230 is also responsible for copying the encrypted packet flow for purposes of decryption and then forwarding the original encrypted packet flow 210 to virtual machine 206 (as represented by encrypted packet flow 212) in a transparent manner. Notably, the retained copy of the encrypted packet flow is then decrypted by virtual tap element 204.

At this stage, decryption manager 232 may be configured to forward the entire decrypted packet flow set (as shown in FIG. 2 as decrypted flow 214) to a network packet analyzer 208. In some embodiments, network packet analyzer 208 is a virtual machine or some other virtual entity completely residing within virtual network environment 200. In other embodiments, network packet analyzer 208 is a hardware based device that is communicatively connected to the computing platform hosting the virtual tap element 204. Network packet analyzer 208 may be any element that is configured to conduct packet analysis (e.g., a net tool optimizer (NTO)) on decrypted packet flows that are communicated entirely within virtual network environment 200. In some embodiments, network packet analyzer 208 may generate statistics regarding the amount of packets and types of packets associated with each different source IP address observed for a predefined time period (e.g., every 10 minutes).

In alternate embodiments, decryption manager 232 may be configured to forward the entire decrypted packet flow set to a filter manager 234 in virtual tap element 204. Filter manager 234 may represent any suitable virtual entity (e.g., a non-transitory computer readable medium, embedded memory, or a memory device) for managing and storing filter criteria data associated with packet monitoring and/or virtual tap related functions. For example, filter manager 234 may store various filtering policies, rules, and/or criteria. In some embodiments, filter manager 234 may be accessible by virtual tap element 204, a virtual tap controller, and/or other entities. For example, virtual tap element 204 may be configured (e.g., by a virtual tap controller) with customized processing rules and/or filters that are stored in or accessible by filter manager 234. In some embodiments, filter manager 234 may be provisioned with a number of policies and rules that eliminates a number of irrelevant packets from the decrypted packet flow set. More specifically, filter manager 234 may be provisioned with filter criteria that includes one or more packet header parameter values such as, but not limited to, a source IP address, a destination IP address, a timestamp, a protocol number or type, a VM identifier, a sequence number, and/or other packet-traffic related characteristics (e.g., a packet size, a jitter value, and/or a latency value).

In some embodiments, filter manager 234 may be prompted by monitoring manager 230 to determine whether packets of a monitored packet flow are directed to a particular VM identifier or IP address, communicated between the virtual machines during a specified time period, and/or based on a particular type of traffic. For example, filter manager 234 may compare parameters of the decrypted packet flow with the filtering criteria. Notably, this filtering process may indicate that headers of the decrypted packets containing a particular source IP address are to be kept or discarded.

Based on the filter criteria used, filter manager 234 may generate a subset of the decrypted packet flow (e.g., a decrypted packet flow subset) that comprises at least a portion of the entire decrypted packet flow set after conducting the filtration process. Namely, filter manager 234 is configured for filtering the decrypted packet flow set to generate a subset of the decrypted packet flow. Once the filtration process is conducted by filter manager 234, monitoring manager 230 may be configured to forward the decrypted packet flow subset (containing the relevant packets) to network packet analyzer 208 for packet processing It will be appreciated that the communications and/or actions depicted in FIG. 2 are for illustrative purposes and that different and/or additional communications and/or actions than those depicted in FIG. 2 may be used for packet monitoring and/or related activities. It will also be appreciated that various communications and/or actions described herein may occur concurrently or in a different order or sequence.

Figure 3:
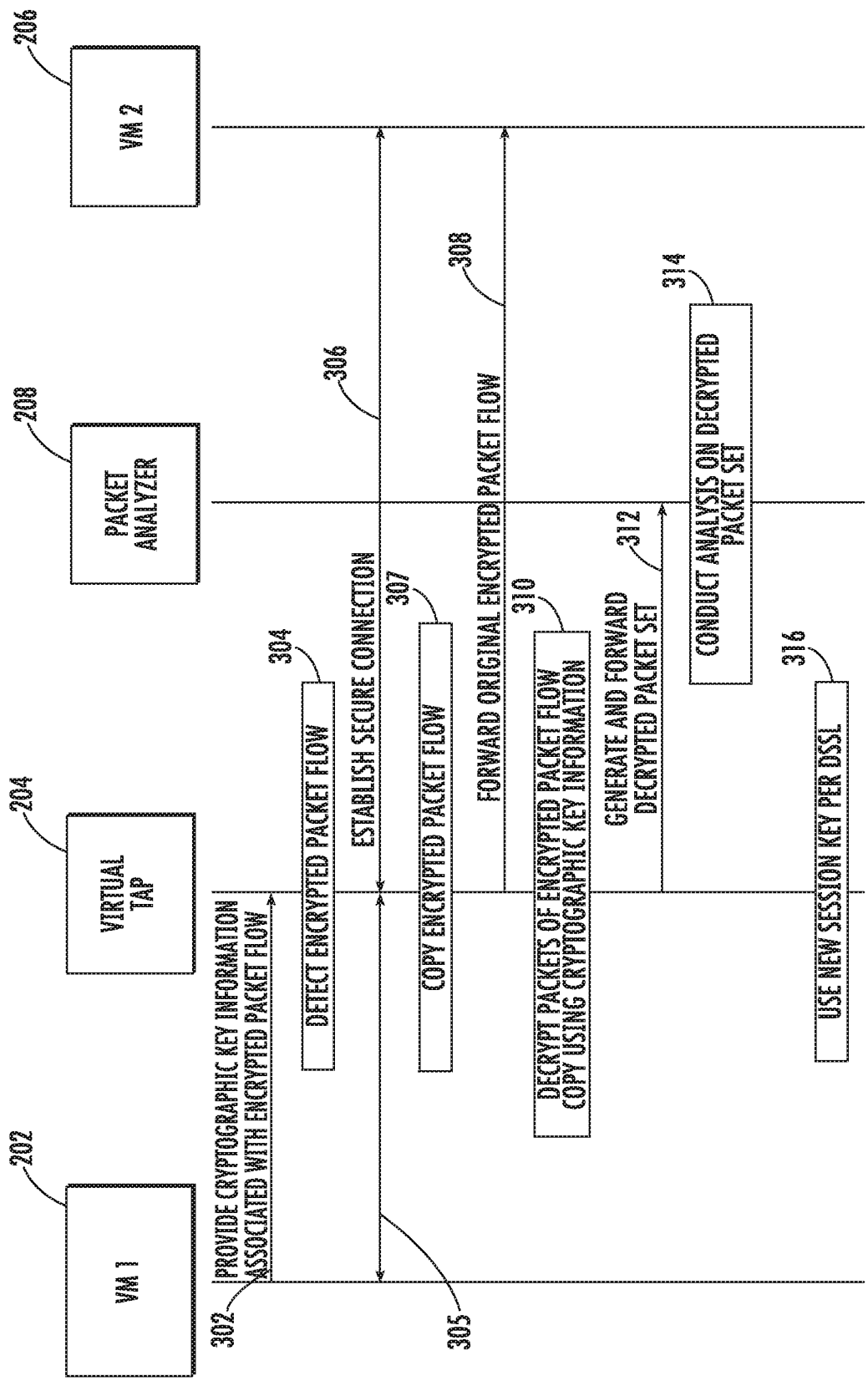
FIG. 3 is a diagram illustrating a signaling diagram illustrating the monitoring encrypted packet flows within a virtual network environment according to an embodiment of the subject matter described herein.

FIG. 3 is a diagram illustrating a signaling diagram illustrating the monitoring encrypted packet flows within a virtual network environment according to an embodiment of the subject matter described herein. Referring to FIG. 3, virtual machine 202 sends a provisioning message containing cryptographic key information to virtual tap element 204 (e.g., via message 302). In some embodiments, the cryptographic key information comprises a private key or a session key and is provided to virtual tap element 204 in instances where virtual tap element 204 is trusted by virtual machine 202 (e.g., virtual tap element 204 has a proper and valid certificate recognized by virtual machine 202 or a tenant associated with virtual machine 202). In some embodiments, the session key may be frequently negotiated between virtual machine 202 and virtual tap element 204 in the event dynamic SSL protocols are employed (see below).

In some embodiments, virtual tap element 204 may be configured store the session key in key store 220. For example, the session key may be mapped to a particular source IP address, destination IP address, or virtual machine identifier that is stored in key store 220, such that the session key may be accessed later by virtual tap element 204 using the corresponding address and/or information. In some embodiments, virtual tap element 204 may utilize the session key for the entire encrypted communication session between virtual machine 202 and virtual machine 206.

In other embodiments, virtual tap element 204 is configured to operate via a dynamic SSL (DSSL) protocol wherein the session key is dynamically changed and/or replaced on a periodic basis. For example, virtual tap element 204 may be configured to replace the secure session key in response to one or more of virtual machine 202 and 206 requesting to establish a dynamic SSL (DSSL) session. In such scenarios, virtual tap element 204 may be configured to frequently access key store 220 to obtain a new previously provisioned session key based on a predefined periodic basis (e.g., every 10 minutes, every hour, etc.).

After receiving and storing the cryptographic key information, virtual tap element 204 may monitor for, and ultimately detect, a packet flow being communicated between virtual machine 202 and virtual machine 206. In some embodiments, virtual tap element 204 may be configured to detect an SSL handshake message, a TLS handshake message, and/or some other secure session request message (e.g., by conducting packet header or payload inspection). For example, virtual machine 202 may attempt to initiate an SSL handshaking procedure with virtual machine 206 by sending an SSL handshake request that is detected by virtual tap element 204.

For example, in block 304, virtual tap element 204 detects a secure session handshake (e.g., SSL handshake) communicated from a first virtual machine 202 to a second virtual machine 206. After receiving a handshake message, virtual tap element 204 may establish a secure session (e.g., an SSL session or a TLS session) with each of virtual machine 202 and virtual machine 206 as a proxy element (e.g., an SSL proxy). Notably, by using a session key previously provided by virtual machine 202, which recognized virtual tap element 204 as a trusted source, virtual tap element 204 is able to decrypt all packets associated with the encrypted packet flow. In particular, by establishing a separate SSL session with each of virtual machine 202 and virtual machine 206, virtual tap element 204 is able to function as a transparent proxy element positioned between the two virtual machines within the same virtual network environment.

After SSL connections 305 and 306 are established via virtual tap element 204, virtual tap element 204 and/or a local monitoring manager may be configured to copy the communicated encrypted packet flow communicated between virtual machine 202 and virtual machine 206 prior to performing the decryption processing. (block 307). After copying the encrypted packet flow, virtual tap element 204 may forward the original encrypted packet flow to the intended destination (e.g., virtual machine 206) in a transparent manner (see arrow 308).

After creating a copy of the encrypted packet flow, virtual tap element 204 may be configured to initiate the decryption process. For example, virtual tap element 204 may decrypt packets belonging to the copy of the encrypted packet flow received from the virtual machine 202 and/or virtual machine 206 using the session key (see block 310). After (or contemporaneously) decrypting the encrypted packet flow, virtual tap element 204 may then forward at least a portion of the decrypted packet flow to packet analyzer 208 (see arrow 312). In some embodiments, virtual tap element 204 may be configured to send all of the decrypted packets of the packet flow copy to packet analyzer 208. Alternatively, virtual tap element 204 may send a filtered subset of the decrypted packet flow to packet analyzer 208. For example, virtual tap element 204 may utilize a filter manager (e.g., filter manager 234 shown in FIG. 2) to filter the decrypted copy of packets to create a subset of the decrypted packet flow. By using the filter manager 234 in this manner, monitoring manager 230 may i) limit analysis to only to packets that are relevant according to predefined filter criteria and ii) reduce the number of packets that network packet analyzer 208 is required to process.

After receiving the forwarded decrypted packets (e.g., either an entire copy of the decrypted packet flow or a subset of the decrypted packet flow) from virtual tap element 204 via an unencrypted channel, packet analyzer 208 may be configured to analyze the decrypted packets (see block 314). In some embodiments, analyzer 208 conducts the packet analysis procedure in accordance with its configuration (e.g., a particular analysis policy that monitors for parameters that are included within the packets).

In block 316, virtual tap element 204 is configured to operate via a DSSL protocol wherein the session key is dynamically changed and/or replaced on a periodic basis. For example, virtual tap element 204 may be configured to replace the secure session key in response to one or more of virtual machine 202 and 206 requesting to establish a DSSL session. In such a scenario, virtual tap element 204 may be configured to frequently access a local key store to obtain a new previously provisioned session key based on a predefined periodic basis (e.g., every 10 minutes, every hour, etc.).

Figure 4:
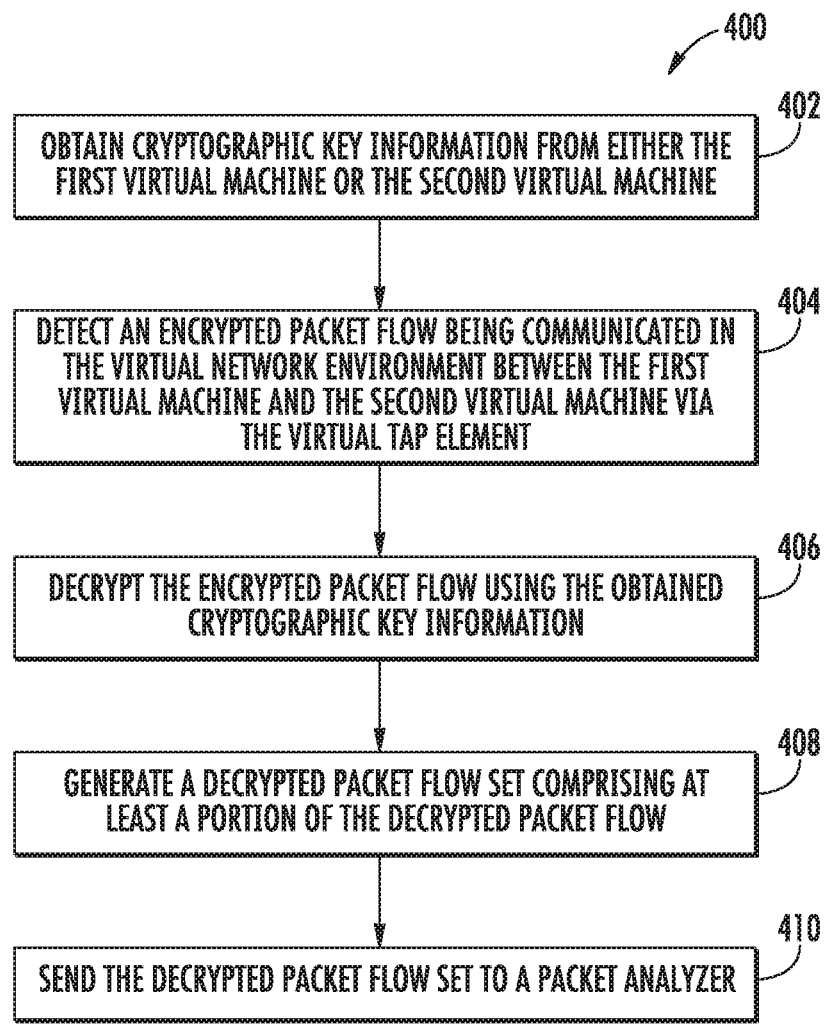
FIG. 4 is a diagram illustrating a process for monitoring encrypted packet flows within a virtual network environment according to an embodiment of the subject matter described herein.

FIG. 4 is a diagram illustrating a process for monitoring encrypted packet flows within a virtual network environment according to an embodiment of the subject matter described herein. In some embodiments, process 400, or portions thereof, may be performed by or at monitoring manager 230, decryption manager 232, and/or another node or module associated with virtual tap element 204 as shown in FIG. 2. In some embodiments, process 400 may include an algorithm comprising steps 402, 404, 406, and/or 408 that is stored in memory and executed by a processor.

In step 402, cryptographic key information is obtained from either the first virtual machine or the second virtual machine. In some embodiments, the first virtual machine is configured to provide a session key to a virtual tap element. In such embodiments, the virtual tap element configured to receive and/or intercept the encrypted packet flow(s) is able to decrypt the encrypted packet flows communicated by the first virtual machine and the second virtual machine. Alternatively, the first virtual machine may provide a copy of the private key to the virtual tap element (which is trusted by the first virtual machine). The virtual tap may then utilize the private decryption key as its own to decrypt the encrypted packet flow to obtain the session key.

In step 404, an encrypted packet flow being communicated in the virtual network environment between the first virtual machine and the second virtual machine via the virtual tap element is detected. For example, the virtual tap element is configured to detect one or more communicated packets indicative of an encrypted packet flow. In some examples, the virtual tap element is configured to detect an SSL handshake procedure and/or a secure session request message.

In step 406, the encrypted packet flow is decrypted using the cryptographic key information. For example, in response to detecting the encrypted packet flow (e.g., step 404), the virtual tap element may establish a secure session between a first virtual machine and a second virtual machine. In some embodiments, the virtual tap element establishes the secure session in such a manner that the virtual tap element is a transparent part of the communication between a first virtual machine and a second virtual machine in a virtual network environment. In one example, the virtual tap element utilizes a session key previously provided by one of the virtual machines that trusts the virtual tap element. In such a scenario, the virtual tap element may use the session key to decrypt an encrypted packet flow communicated between the first virtual machine and the second virtual machine. In another example, the virtual tap utilizes a private decryption key that is previously provided by one of the virtual machines that trusts the virtual tap element. Notably, the virtual machine may utilize the private decryption key to decrypt a message containing a negotiated session key from a sending virtual machine.

In step 408, a decrypted packet flow set comprising at least a portion of the decrypted packet flow is generated. For example, the virtual tap element can decrypt the encrypted packet flow (or a copy of the encrypted packet flow) and then may generate a decrypted packet flow set that is ultimately sent to a packet analyzer. In some embodiments, the virtual tap element may decrypt the entire encrypted packet flow and include all of the decrypted packets in the decrypted packet flow set. In other examples, the virtual tap element may utilize a filter manager to filter the generated decrypted packet flow set which is ultimately packaged as a subset of the decrypted packet flow.

In step 410, the decrypted packet flow set is sent to a packet analyzer. For example, the virtual tap element may be configured to send the decrypted packet set (i.e., generated by the virtual tap element in step 408) to a packet analyzer. In some embodiments, the packet analyzer is a virtual entity residing completely within the virtual network environment. In other embodiments, the package analyzer may be a hardware-based packet analyzer that is configured to receive unencrypted packets from a communicatively connected virtual tap element.

It will be appreciated that process 400 is for illustrative purposes and that different and/or additional actions may be used. It will also be appreciated that various actions described herein may occur in a different order or sequence.

It should be noted that monitoring manager 230, decryption manager 232, and/or functionality described herein may constitute a special purpose computing device. Further, a virtual tap comprising monitoring manager 230, and decryption manager 232, and/or functionality described herein can improve the technological field of packet monitoring by providing mechanisms for monitoring encrypted packets in a virtual network environment in a manner that cannot be monitored by a physical network tap.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for monitoring encrypted packet flows within a virtual network environment, the method comprising:
   at a virtual tap element residing in between a first virtual machine and a second virtual machine in a virtual network environment, wherein the virtual network environment comprises a single computing platform that includes each of the first virtual machine, the second virtual machine, and the virtual tap element, wherein communication between two or more of the first virtual machine, the second virtual machine, and the virtual tap element is conducted via a backplane bus of the single computing platform;
   obtaining cryptographic key information from either the first virtual machine or the second virtual machine;
   detecting an encrypted packet flow being communicated in the virtual network environment between the first virtual machine and the second virtual machine via the virtual tap element, wherein the virtual tap element includes a virtual key store that stores the cryptographic key information that is mapped to the encrypted packets flow communicated between the first virtual machine and the second virtual machine;
   decrypting the encrypted packet flow using the cryptographic key information, wherein the virtual tap element is configured to operate via a dynamic SSL (DSSL) protocol and access the key store to obtain a new previously provisioned cryptographic key information based on a predefined periodic basis, such that the cryptographic key information used to decrypt the encrypted packet flow is dynamically changed in accordance to the predefined periodic basis;
   generating a decrypted packet flow set comprising at least a portion of the decrypted packet flow; and
   sending the decrypted packet flow set to a packet analyzer.

2. The method of claim 1 wherein generating a decrypted packet flow set comprising at least a portion of the decrypted packet flow includes filtering the decrypted packet flow set to generate a subset of the decrypted packet flow.

3. The method of claim 1 wherein each of the first virtual machine and the second virtual machine comprises a virtual workload, a virtual function, or a virtual container.

4. The method of claim 1 wherein the first virtual machine and the second virtual machine are respectively supported by a first hardware device and a second hardware device that communicate via the backplane bus of the single computing platform.

5. The method of claim 1 wherein the encrypted packet flow is communicated via a TLS session or an SSL session.

6. The method of claim 1 comprising obtaining new cryptographic key information from the virtual key store within the virtual tap element if the encrypted packet flow is communicated via the DSSL protocol.

7. The method of claim 1 wherein the virtual tap element is configured to establish a secure session with each of the first virtual machine and the second virtual machine to communicate the encrypted packet flow.

8. A system for monitoring encrypted packet flows within a virtual network environment, the system comprising:
at least one processor;
memory; and
a virtual tap element implemented using the at least one processor, wherein the virtual tap element is configured to obtain cryptographic key information from either a first virtual machine or a second virtual machine, to detect an encrypted packet flow being communicated in the virtual network environment between the first virtual machine and the second virtual machine via the virtual tap element, wherein the virtual tap element includes a virtual key store that stores the cryptographic key information that is mapped to the encrypted packets flow communicated between the first virtual machine and the second virtual machine, to decrypt the encrypted packet flow using the cryptographic key information, wherein the virtual tap element is configured to operate via a dynamic SSL (DSSL) protocol and access the key store to obtain a new previously provisioned cryptographic key information based on a predefined periodic basis, such that the cryptographic key information used to decrypt the encrypted packet flow is dynamically changed in accordance to the predefined periodic basis, to generate a decrypted packet flow set comprising at least a portion of the decrypted packet flow, and to send the decrypted packet flow set to a packet analyzer, wherein the virtual network environment comprises a single computing platform that includes each of the first virtual machine, the second virtual machine, and the virtual tap element, wherein communication between two or more of the first virtual machine, the second virtual machine, and the virtual tap element is conducted via a backplane bus of the single computing platform.

9. The system of claim 8 wherein the virtual tap element is further configured to filter the decrypted packet flow set to generate a subset of the decrypted packet flow.

10. The system of claim 8 wherein each of the first virtual machine and the second virtual machine comprises a virtual workload, a virtual function, or a virtual container.

11. The system of claim 8 wherein the first virtual machine and the second virtual machine are respectively supported by a first hardware device and a second hardware device that communicate via the backplane bus of the single computing platform.

12. The system of claim 8 wherein the encrypted packet flow is communicated via a TLS session or an SSL session.

13. The system of claim 8 wherein the virtual tap element is further configured to obtain new cryptographic key information from the virtual key store within the virtual tap element if the encrypted packet flow is communicated via the DSSL protocol.

14. The system of claim 8 wherein the virtual tap element is configured to establish a secure session with each of the first virtual machine and the second virtual machine to communicate the encrypted packet flow.

15. A non-transitory computer readable medium having stored thereon executable instructions embodied in the computer readable medium that when executed by at least one processor of a computer cause the computer to perform steps comprising:
obtaining, by a virtual tap element, cryptographic key information from either a first virtual machine or a second virtual machine in a virtual network environment, wherein the virtual network environment comprises a single computing platform that includes each of the first virtual machine, the second virtual machine, and the virtual tap element, wherein communication between two or more of the first virtual machine, the second virtual machine, and the virtual tap element is conducted via a backplane bus of the single computing platform;
detecting an encrypted packet flow being communicated in the virtual network environment between the first virtual machine and the second virtual machine via the virtual tap element, wherein the virtual tap element includes a virtual key store that stores the cryptographic key information that is mapped to the encrypted packets flow communicated between the first virtual machine and the second virtual machine;
decrypting the encrypted packet flow using the cryptographic key information, wherein the virtual tap element is configured to operate via a dynamic SSL (DSSL) protocol and access the key store to obtain a new previously provisioned cryptographic key information based on a predefined periodic basis, such that the cryptographic key information used to decrypt the encrypted packet flow is dynamically changed in accordance to the predefined periodic basis;
generating a decrypted packet flow set comprising at least a portion of the decrypted packet flow; and
sending the decrypted packet flow set to a packet analyzer.

16. The non-transitory computer readable medium of claim 15 wherein generating a decrypted packet flow set comprising at least a portion of the decrypted packet flow includes filtering the decrypted packet flow set to generate a subset of the decrypted packet flow.

17. The non-transitory computer readable medium of claim 15 wherein each of the first virtual machine and the second virtual machine comprises a virtual workload, a virtual function, or a virtual container.

18. The non-transitory computer readable medium of claim 15 wherein the first virtual machine and the second virtual machine are respectively supported by a first hardware device and a second hardware device that communicate via a backplane bus of the single computing platform.

19. The non-transitory computer readable medium of claim 15 wherein the encrypted packet flow is communicated via a TLS session or an SSL session.

20. The non-transitory computer readable medium of claim 15 comprising obtaining new cryptographic key information from the virtual key store within the virtual tap element if the encrypted packet flow is communicated via the DSSL protocol.

* * * * *